(12) United States Patent
Alekseev

(10) Patent No.: US 11,617,986 B2
(45) Date of Patent: Apr. 4, 2023

(54) METHOD AND APPARATUS FOR SEPARATION OF 13C16O FROM NATURAL CO

(71) Applicant: Linde GmbH, Pullach (DE)

(72) Inventor: Alexander Alekseev, Pullach (DE)

(73) Assignee: Linde GmbH, Pullach (DE)

( * ) Notice: Subject to any disclaimer, the term of this patent is extended or adjusted under 35 U.S.C. 154(b) by 0 days.

(21) Appl. No.: 17/445,457

(22) Filed: Aug. 19, 2021

(65) Prior Publication Data

US 2022/0054980 A1 Feb. 24, 2022

(30) Foreign Application Priority Data

Aug. 24, 2020 (EP) .................................... 20020383

(51) Int. Cl.
| | |
|---|---|
| *B01D 3/14* | (2006.01) |
| *B01D 59/04* | (2006.01) |
| *C01B 32/40* | (2017.01) |
| *B01D 3/32* | (2006.01) |

(52) U.S. Cl.
CPC ............. *B01D 59/04* (2013.01); *B01D 3/143* (2013.01); *B01D 3/32* (2013.01); *C01B 32/40* (2017.08); *C01P 2006/88* (2013.01)

(58) Field of Classification Search
CPC .......... B01D 3/143; B01D 3/32; B01D 59/04; C01B 32/40; C01P 2006/88
See application file for complete search history.

(56) References Cited

U.S. PATENT DOCUMENTS

| | | | | |
|---|---|---|---|---|
| 2,586,717 | A * | 2/1952 | Robinson ............... | B01D 59/04 202/205 |
| 5,286,468 | A * | 2/1994 | Chang .................... | B01D 3/322 423/437.2 |
| 6,202,440 | B1 * | 3/2001 | Hayashida ............. | B01D 59/04 62/919 |
| 6,461,583 | B1 * | 10/2002 | Hayashida ............. | F25J 3/0295 202/172 |
| 6,605,190 | B1 * | 8/2003 | Salamon ................. | B01D 3/14 203/1 |
| 6,835,287 | B1 * | 12/2004 | Kihara ....................... | F25J 3/08 202/202 |
| 8,002,952 | B2 * | 8/2011 | Sechrist ................. | B01D 3/007 62/238.7 |

(Continued)

FOREIGN PATENT DOCUMENTS

EP          0908226 B1     2/2006

*Primary Examiner* — Jonathan Miller
(74) *Attorney, Agent, or Firm* — Millen White Zelano & Branigan, PC; Brion P. Heaney

(57) ABSTRACT

Method and Apparatus for separating at least one CO isotope compound, especially isotope compound 13C16O, from natural CO, comprising:
a rectification column system (110) comprising a plurality of rectification sections (112,114,116,118,120) arranged adjacent to one another in a chain-like manner, including an upper rectification section (112) and a plurality of lower rectification sections (114,116,118,120), each rectification section comprising a heating means (112a,114a, 116a,118a,120a) to maintain evaporation of liquid present therein, provided that the heating means (112a) of the at least one of the plurality of rectification sections (112) is provided to comprise a heat pump cycle (112b).

20 Claims, 3 Drawing Sheets

(56) References Cited

U.S. PATENT DOCUMENTS

| | | | |
|---|---|---|---|
| 10,710,000 B2* | 7/2020 | Sanagooy Moharrer | B01D 5/0039 |
| 11,400,415 B2* | 8/2022 | Galbiati | B01D 59/04 |
| 2005/0044886 A1* | 3/2005 | Okasinski | B01D 59/50 62/919 |
| 2005/0129592 A1* | 6/2005 | Kihara | B01D 59/04 62/643 |
| 2017/0036138 A1* | 2/2017 | Kishimoto | B01D 3/32 |
| 2020/0340740 A1* | 10/2020 | Turner | F25J 3/0257 |

* cited by examiner

METHOD AND APPARATUS FOR SEPARATION OF 13C16O FROM NATURAL CO

CROSS-REFERENCE TO RELATED APPLICATIONS

This application claims priority pursuant to 35 U.S.C. 119(a) to European Patent Application No. 20020383.4, filed Aug. 24, 2020, which application is incorporated herein by reference in its entirety.

FIELD OF THE INVENTION

The present invention relates to an apparatus and a method for separating at least one CO isotope compound, especially 13C16O, from natural CO.

Systems for separation of certain isotopes or isotope compounds, especially isotopes or isotope compounds containing certain substances, by means of cryogenic rectification are well known. Usually, a corresponding system comprises a rectification column system comprising a plurality of rectification sections arranged in a chain-like manner, comprising an upper or first rectification section and a number of lower, or second to n-th rectification sections. This means that a top end of an n-th rectification section is arranged to be in fluid connection with the bottom end of an n−1th rectification section.

The upper rectification section, into which the feed is injected (in the middle or lower part), comprises a condenser device or head condenser arranged on the top and a reboiler arranged in the bottom. The lowermost of the lower sections comprises a reboiler device, which is connected to or integrated into the lower part of the lowermost section. Between the upper and the lowermost section there can be provided any expedient number of additional sections, generally referred to as lower sections herein. Each of the rectification sections can be equipped with reboilers as heating means.

As is well known in the art, a rectification or separation column is an apparatus for the thermal separation of mixtures of substances, wherein:

The multi-component mixture to be separated (feed or inlet) is fed into the separation column at a suitable point, gaseous, liquid, or two-phase, Within the column, this mixture is separated into several (at least two) material streams comprising different products, The product material flows are removed from the column at suitable points, usually in the upper or lower part of the column, in a liquid or gaseous state. If necessary, they can also be removed at other locations (e.g., in the middle of the column).

In this connection, three process engineering attributes are important for effectiveness of the operations within the separation column:

Liquid stream that flows continuously from top to bottom in the separation column, Vapor stream, which moves continuously from bottom to the top of the column, Internals (sieve trays or structured packing) which ensure an intensive heat and mass exchange between both these mass flows (liquid and vapor).

These three features must be realized in a rectification column. If any one of these features is missing (e.g., the vapor stream or the liquid stream), no mixture separation can be achieved. However, if these three features are met, and if the operation conditions for the given mixture of substances are correctly selected, then continuous rectification occurs, i.e., accumulation of the low-boiling component[s] in the vapor and corresponding continuous accumulation of the high-boiling component[s] in the liquid. The low-boiling substance accumulates in the upper part of the separation column, the high-boiling substance accumulates in the lower part of the separation column.

Be it noted that the term rectification section shall also include a plurality of such rectification columns switched in parallel or in series.

The rectification columns may be arranged in a vertical manner, i.e. one above the other. In this case, the liquid from one column (or, in the language used in the present application, from one section) placed above a further column or section can naturally flow into the column or section arranged below it, and the vapor stream from the column or section placed below it can naturally flow into the column placed above it. The rectification columns may also be arranged in a horizontal way: one next to the other. In this case, additional means for providing the liquid and vapor from one column to the other are required for pumping or moving the fluids or vapours, for example provided as pumps or blowers or compressors, between the various rectification columns, can be provided.

Carbon, C, comprises essentially two stable isotopes, 13C, with an abundance of around 1% in natural carbon, and 12C, with an abundance of around 99%. Correspondingly, natural carbon monoxide, CO, comprises two main isotopes, 12CO and 13CO. As a consequence, of the isotope distribution in C, for CO the heavier isotope 13CO constitutes around 1% of the total CO.

Since natural oxygen consists essentially of three isotopes 16O, 17O and 18O, there are six CO-compounds, 12C16O, 12C17O, 12C18O, 13C16O and 13C17O, 13C18O, but due to the natural abundance of oxygen isotopes, natural CO is considered as a ternary mixture of 12C16O, 12C18O and 13C16O Systems for separation of these CO-isotopes or isotope compounds usually comprise an electric heater as a reboiler device in all rectification sections, and a heat exchanger cooled by liquid nitrogen as condenser device in the upper rectification section. As a typical example, it is referred to EP 0 908 226 B1.

The requirement of liquid nitrogen for providing the necessary cooling essentially defines the power consumption of such a rectification system. It is relatively high especially because the evaporation heat of the liquid nitrogen has to balance two heat flows, namely the cold loss through the insulation of the system, and heat generated by electric heaters integrated in every column or section of the rectification system.

SUMMARY OF THE INVENTION

The invention provides a method for separating at least one CO isotope compound, especially isotope compound 13C16O, from natural CO, comprising operating a rectification column system comprising a plurality of rectification sections arranged adjacent to one another in a chain-like manner, including an upper rectification section and a plurality of lower rectification sections, wherein maintaining evaporation of liquid present in the rectification column is achieved by heating the liquid by heating means provided in each rectification section, wherein the heating in least one of the plurality of rectification sections is provided by heating means comprising a heat pump cycle. Preferably, the heating of at least one further one of the plurality of rectification sections is provided by means comprising an electrical heater.

Typically, and according to a preferred embodiment of the invention, the heat pump cycle comprises an external cycle with an external working fluid, which comprises 1) a compressor unit with compresser(s) and aftercooler(s), where the working fluid is compressed from low pressure level to a high pressure level and cooled to a temperature close to the ambient temperature, 2) a main counter-current heat exchanger, where the compressed working fluid is cooled to a temperature close to the dew temperature of the working fluid at given pressure, 3) a reboiler or first heat exchanger, where the working fluid is condensed, the condensation heat is transferred from the working fluid to an external recipient, 4) an expansion valve, where the working fluid is isenthalpically expanded from the high pressure level to the low pressure level, the condensed working fluid evaporates partially during this expansion, 5) a condenser or second heat exchanger, where the remaining liquid working fluid is evaporated, absorbing the corresponding evaporation heat from an external source. After the evaporation in heat second exchanger, the working fluid flows through the counter-current heat exchanger to the compressor inlet. Sometimes the heat pump cycle consists of an additional counter-current heat exchanger—the so-called subcooler-placed before the expansion valve, the condensed working fluid from the outlet of the first heat exchanger is cooled here by colder working fluid from the outlet of the second heat exchanger, which is provided through this heat exchanger before it flows to the main heat exchanger.

The heat pump cycle provides two functions: a) it delivers a heat capacity, which can be applied for heating purposes by means of reboiler or first heat exchanger, b) it delivers a cold capacity, which can be applied for cooling purposes by means of the condenser or second heat exchanger.

The heat pump cycle can be applied for driving the CO-rectification systems, providing the heat capacity for heating at the bottom of rectification section and cooling for condenser on the top of the upper section whereby the first heat exchanger is acting as reboiler, and the second heat exchanger is action as condenser for rectification system.

The preferred working fluid of the heat pump cycle in given case is the nitrogen, but the CO can be used, too, since this fluid is available in the system.

Advantageously, the heating in the upper rectification section is provided to utilize a heat pump cycle connecting a reboiler of the upper rectification section and a condenser associated with upper rectification section.

Expediently, pressures within the rectification column system range from 0.5.bar abs in the upper rectification section to around 3 bar abs in a lowermost rectification section.

Furthermore, temperatures within the rectification column system expediently range from 77K in the upper rectification section to around 95K in a lowermost rectification section.

The liquid working fluid of the heat pump cycle can be supplied to the condenser without a pump, if the pressure in the heat pump cycle is sufficiently high.

Since a) the heat pump cycle does not generate the cooling capacity actively, b) the rectification system needs some external cold to compensate the heat inleak through the thermal insulation, an external cold source in form of liquid nitrogen is used for these cooling purposes.

According to a preferred embodiment, the nitrogen, which is used as working fluid of the heat pump cycle can be supplied to the condenser using at least one pump. Hereby, the liquid nitrogen from a liquid nitrogen vessel for cooling purposes can be injected into the heat pump cycle at the corresponding place. The liquid nitrogen vessel can be positioned below the condenser unit.

The invention further provides an apparatus for separating at least one CO isotope compound, especially isotope compound 13C16O, from natural CO, comprising:

a rectification column system comprising a plurality of rectification sections arranged adjacent to one another in a chain-like manner, including an upper rectification section and a plurality of lower rectification sections, each rectification section comprising a heating means to maintain evaporation of liquid present therein, wherein the heating means of the at least one of the plurality of rectification sections is provided to comprise a heat pump cycle.

The product of separation is a material stream enriched on isotope 13C in form of 13C16O. The concentration of 13C16O in this material stream is higher than 10 mol %, preferably higher than 20 mol % or even higher than 90 mol %.

Providing such a heat pump cycle constitutes an effective means of minimizing energy requirements in connection with heating capacity of a rectification column system. Typically, for example by providing the upper rectification section of a rectification column system with such a heat pump cycle, around or at least 50% of the heating requirements of the whole system can be met. Advantageously, this heat pump cycle uses nitrogen as its working fluid or refrigerant. Liquid nitrogen constitutes a highly effective refrigerant for a condenser, in which light fractions obtained in a rectification column system for separating isotope compounds of CO are condensed.

Advantageously, the heating means of the upper rectification section is provided to comprise a heat pump cycle connecting a reboiler of the upper rectification section and a condenser associated with the upper rectification section. This condenser can either be provided or arranged within or above the upper rectification section. The energy requirements of an upper rectification system are particularly high, so that the invention provides its maximum benefit if used therewith.

According to a preferred embodiment, at least one of the plurality of lower rectification sections comprises an electric heating means. Electric heating means constitute a heating source which requires relatively little maintenance.

Advantageously, the rectification sections provided with heating means comprising a heat pump cycle are arranged above-the-ground, and rectification sections not provided with heating means comprising a heat pump cycle are arranged underground. Especially, electric heating means, which, as mentioned above, require little maintenance, so that a positioning of them underground is feasible, are useable for the underground sections. By means of providing the lower sections (lower part) of a rectification column system underground, additional reliability and availability can be achieved for the rectification column system as a whole.

According to a preferred embodiment of the apparatus, the heat pump cycle comprises a compressor unit adapted to compress gaseous nitrogen, an inlet pressure of the compressor unit being around 0.5 to 1.5 bar abs, and an outlet pressure of the compressor unit being larger than 1.5 bar abs. Expediently, the compressor unit can comprise two or more compressors switched in parallel, for reliability and redundancy purposes.

BRIEF DESCRIPTION OF THE DRAWINGS

The invention will now be further described with reference to the accompanying drawings. Herein.

DETAILED DESCRIPTION

Figure 1:
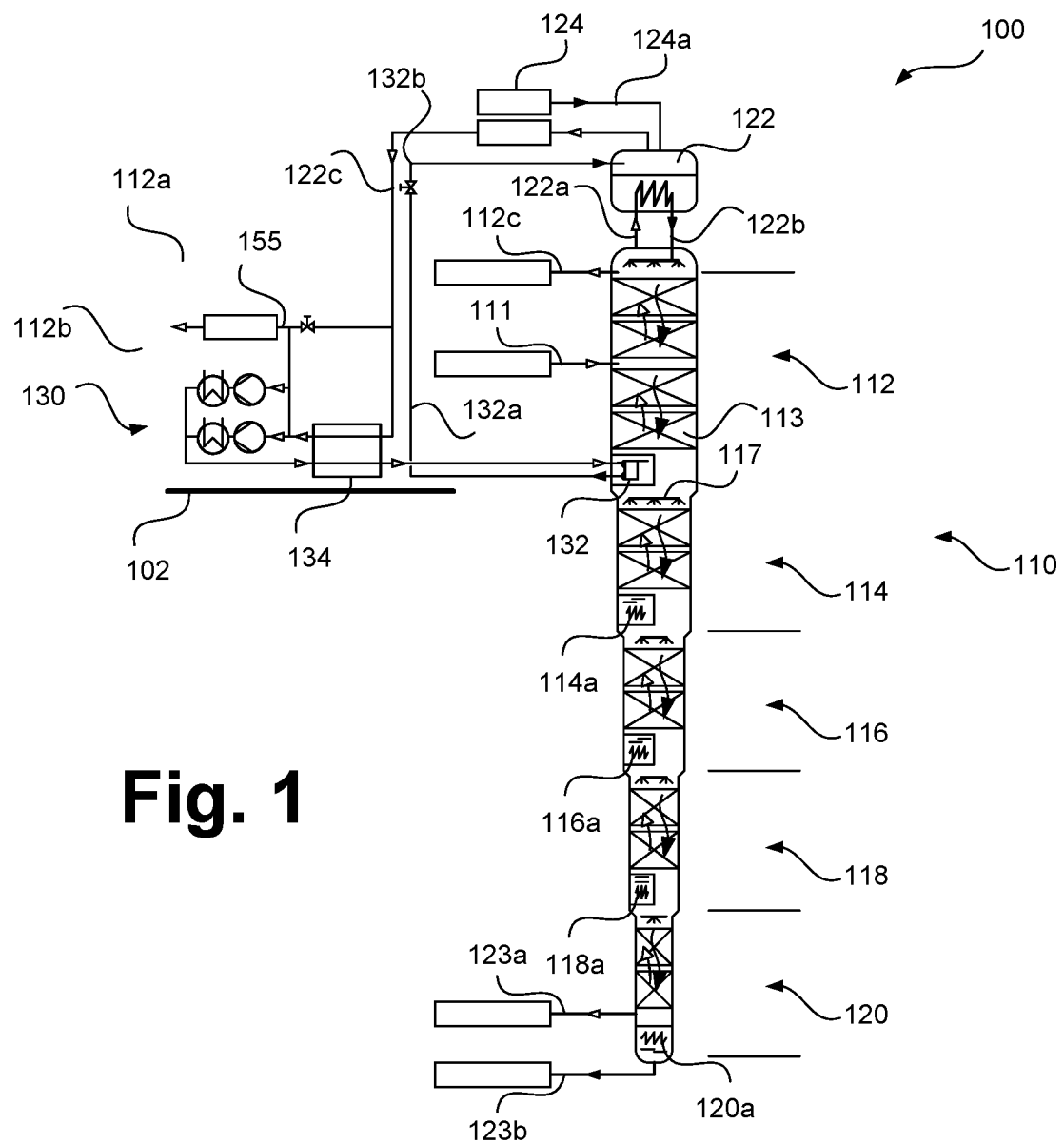
FIG. 1 shows a first preferred embodiment of a process and apparatus according to the invention.

An apparatus according to a first preferred embodiment of the invention is generally designated 100. Apparatus 100 comprises a rectification column system 110 comprising an upper rectification section 112 and a plurality of lower rectification sections 114, 116, 118, 120. Rectification section 120 is referred to as the lowermost rectification section in the following. Each rectification section is provided with at least one packing, only one of which, designated 113, is provided with a reference numeral.

As indicated by line 102, rectification section 112 is arranged above-the-ground, while the further rectification sections 114 to 120 are arranged underground, i.e. below ground level. Such an arrangement provides stability for a rectification column system as a whole.

Each rectification section comprises a heating means, the upper section comprises a condenser for condensation purposes, as will be explained in the following.

Each of the lower rectification sections, in the embodiments as shown each of the underground rectification sections, is provided with electric heating means 114a, 116a, 118a, 120a. Electric heaters require little maintenance, so that an arrangement underground is feasible and reliable.

The heating means of upper rectification section 112 are generally designated 112a. They comprise a heat pump cycle, as will be explained in the following.

The heat pump cycle, which is referenced as 112b in the following, serves to provide a closed nitrogen cycle, and comprises a compression or compresser unit 130 comprising compressers and aftercoolers, a reboiler (also referred to as first heat exchanger) 132 arranged within the upper rectification section 112, and a main counter current heat exchanger (also referred to as second heat exchanger) 134. Heat pump cycle 112b connects reboiler 132, and a condenser 122 (also referred to as third heat exchanger) associated with the upper rectification section, and provided in the upper part or above the upper rectification section 112.

The rectification column system 110 serves to separate the fraction containing the lighter isotope C12O16 from the fraction containing heavier isotope C13O16 from a feed of natural CO. To achieve this, a natural, gaseous CO-feed which contains roughly 1% of 13C16O, is introduced into the upper rectification section 112 via feed line 111. Be it noted that in this description, arrows indicated with contours only or as white triangles, such as in feed line 111, designate gaseous flows, while arrows indicated as filled out or black triangles, such as for example line 132a as mentioned below, designate liquid flow through respective flow lines or channels.

The rectification column system as shown serves to separate this CO feed into one distillate fraction, i.e. C12O16-reach fraction, exiting the rectification column system 110 in the head portion of upper rectification column 112 via line 112c, and one bottoms fraction, i.e. C13O16-reach fraction, exiting the rectification column system through lines 123a (in vapour form) and 123b (in liquid form), these lines being provided in the lowermost rectification section 120.

The rectification column system requires a reflux for operation. Such reflux is achieved by means of condenser 122 provided above the upper rectification section 112, by means of which at least a portion of the condensed overhead liquid product is returned to the upper part of the rectification column system.

Inside the rectification column system, the down-flowing reflux liquid provides cooling and condensation of up-flowing vapours, thereby increasing the efficiency of the system, as is well known in the art.

Typically, structured packing is provided in each of the rectification sections 112,114,116,118,120, one of which is designated with reference numeral 117. This packing provides good physical contact between the up-flowing vapour and the down-flowing liquid.

Liquid nitrogen LIN from a liquid nitrogen source 124 is introduced into the condenser 122 via line 124a, where it interacts in a heat exchanging manner with C12O16-enriched vapor entering the condenser 122 via line 122a, i.e. the distillation fraction which is to be isolated and extracted in the upper rectification section 112. After this interaction, condensed, i.e. liquid C12O16-reach re-enters condenser 122 via line 122b.

As already mentioned, a part of the C12O16-reach fraction exits the upper rectification section 112 in vaporous form via line 112c. A further part of vaporous C12O16-reach, as also outlined above, enters condenser 122, where it condenses due to heat exchanging interaction with liquid nitrogen. Hereby, liquid nitrogen is heated and, as gaseous nitrogen GAN, fed to the main counter current heat exchanger 134, where, flowing through line 122b, it is heated against itself. Be it noted that part of the gaseous nitrogen can also released from the system to the surroundings of the system via line 155.

After exiting main counter current heat exchanger 134, the gaseous nitrogen passes through compressor unit 130 and returns through main counter current heat exchanger 134, from where it is fed into reboiler 132, still as gaseous nitrogen. Expediently, for redundancy purposes, compressor unit is provided with two separate and independently operable compressers, each provided with an aftercooler, as shown in FIG. 1.

Reboiler 132 serves as an evaporator within the first or upper rectification section 112. The nitrogen passed into reboiler 132 as gaseous nitrogen exits the reboiler as liquid nitrogen and, via a line 132a, is throttled through a throttle or expansion valve 132b, and re enters condenser 122 in liquefied form.

For typical processes, a heating system comprising reboiler 132 as evaporator for the upper rectification section 112 can provide at least 50% of the total evaporation power required in the rectification column system as a whole.

For the compressor unit 130, inlet pressures typically range from 0.5 to 1.5 bar abs, while outlet pressures are typically above 1.5 bar abs.

Figure 2:
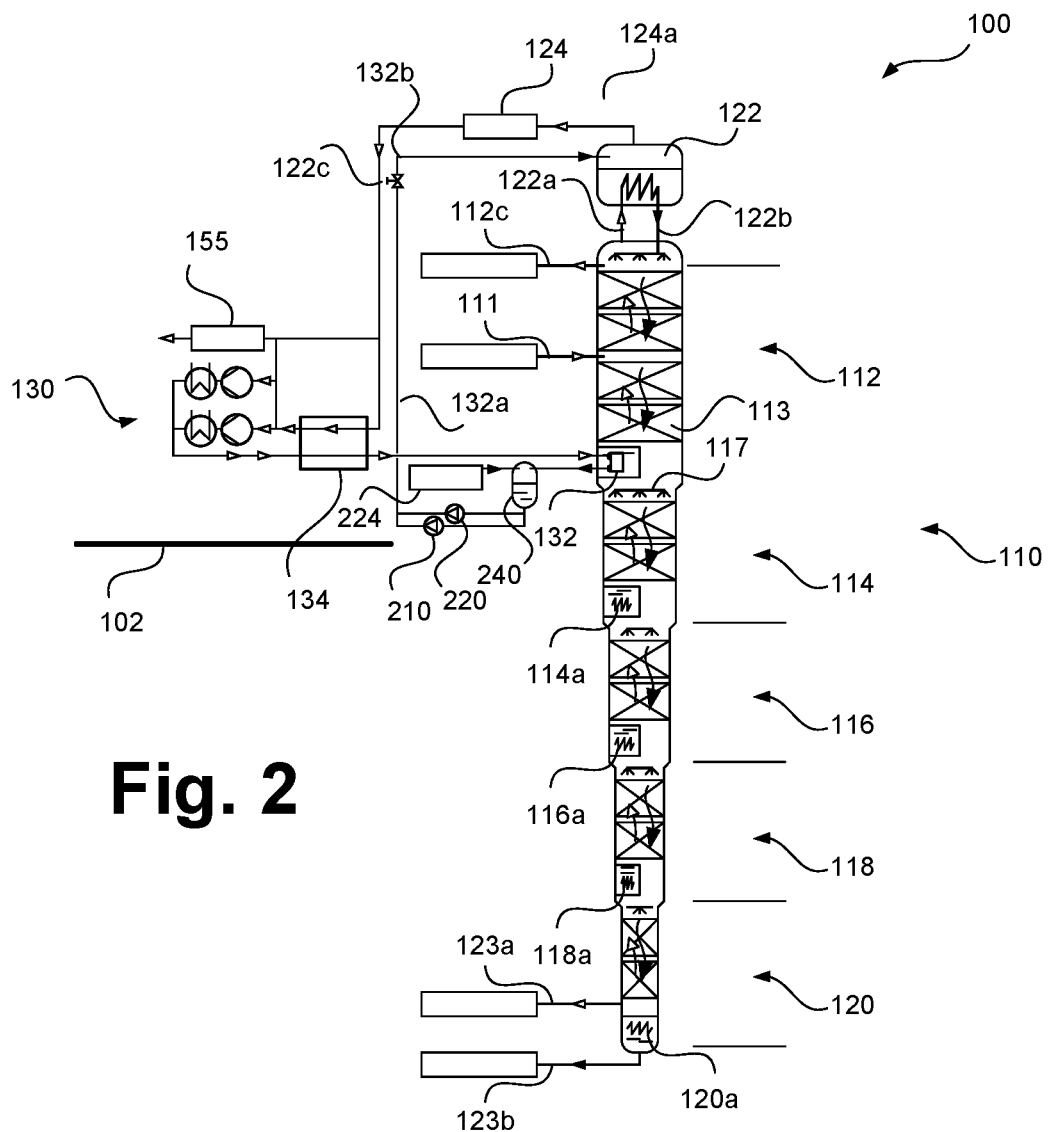
FIG. 2 shows a second preferred embodiment of a process and apparatus according to the invention and FIG. 3 shows a third preferred embodiment of a process and apparatus according to the invention.

FIG. 2 shows a second preferred embodiment of a rectification column system according to the invention. Herein, components corresponding to those used in the first embodiment shown in FIG. 1 are provided with the same reference numerals.

In this embodiment, two redundant pumps 210, 220 are provided for pumping liquefied nitrogen LIN from a liquid nitrogen source 224 and liquid nitrogen exiting reboiler 132 to condenser 122 via line 132a. Advantageously, a phase separator 240 is provided downstream of the pumps 210,220 to prevent any gaseous nitrogen from entering line 132a. Again, by means of throttle 122b, this liquefied nitrogen pumped by pumps 210,220 is further cooled by means of throttling (expansion or throttle valve 122b) before entering condenser 122. As opposed to the first embodiment shown in FIG. 1, in which liquid nitrogen can be introduced directly into condenser 122, in the embodiment according to FIG. 2 it is introduced downstream of pumps 210, 220, as mentioned from source 224.

Any remaining evaporated gaseous nitrogen can be removed by phase separator 240 after passing through the reboiler 132, as shown. Such a phase separator could also be arranged upstream of the reboiler 132.

Figure 3:
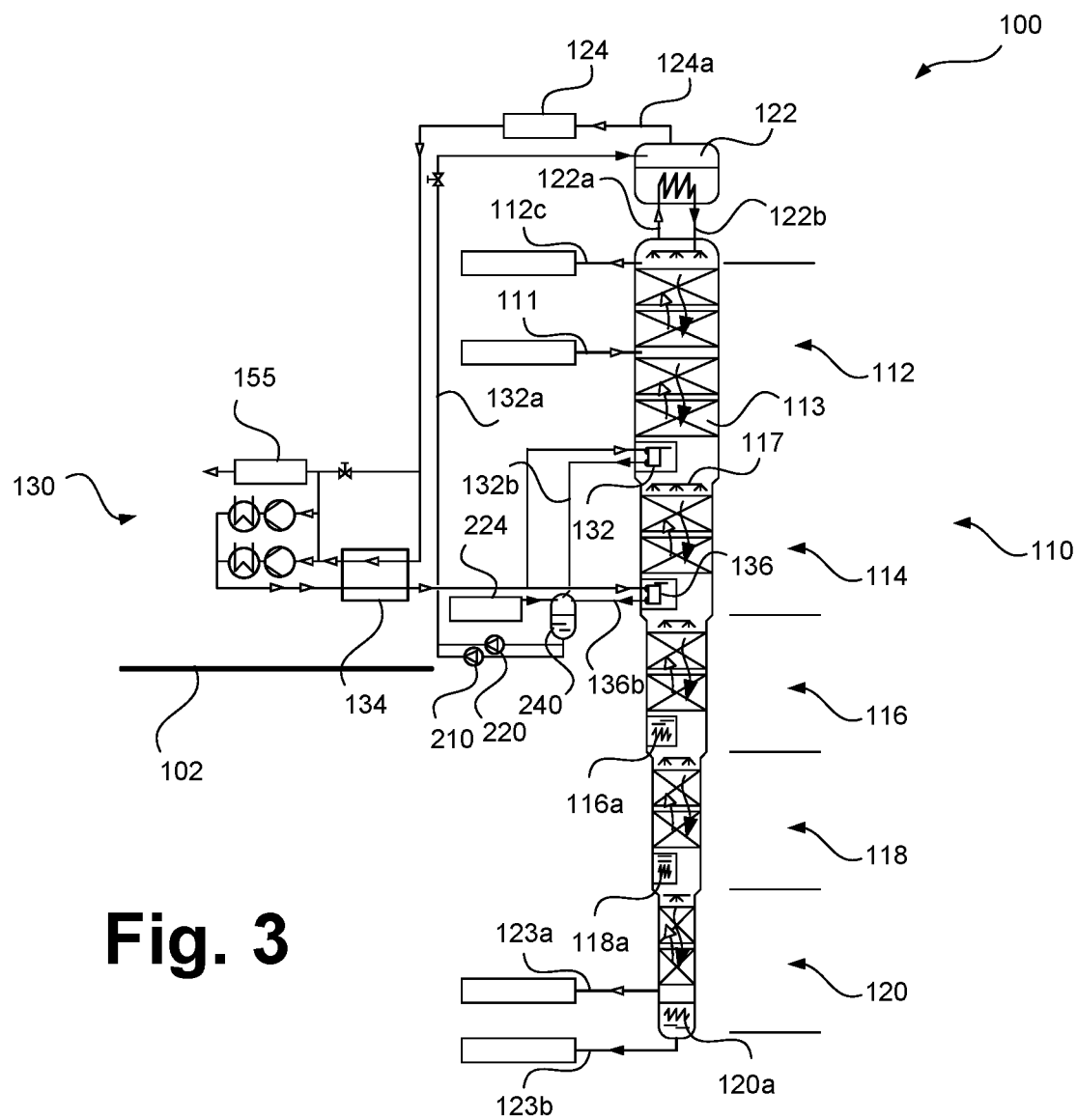

In a further embodiment of the rectification column system according to the invention, shown in FIG. 3, like components are again shown with the same reference numerals.

In this embodiment, the upper rectification section 112 and an adjacent lower rectification section 114 are heated by means of heating means 112a comprising a heat pump cycle 112b. Herein, gaseous nitrogen exiting main counter current heat exchanger 134 is introduced into reboiler 132 provided in upper rectification section 112, and a further heat exchanger or reboiler 136 provided in the lower rectification section 114 arranged below the first or upper rectification section 112.

By thus heating two reboilers 132, 136, by means of this heat pump cycle, typically at least two-thirds of the heat demand of the rectification column system can be provided.

The rectification column system shown in FIG. 3 can be provided with pumps 210, 220 for pumping liquid nitrogen into condenser 122, as shown, in a corresponding manner to the embodiment of FIG. 2, or without such pumps, corresponding to the embodiment of FIG. 1. Again, a phase separator 240 is advantageously provided upstream of pumps 210,220, in order to effectively capture any gaseous nitrogen exiting reboiler 132 or reboiler 136 via lines 132b and 136b respectively.

The invention claimed is:

1. A method for separating at least one CO isotope compound from natural CO, comprising:
    subjecting a CO feed stream to rectification in a rectification column system (110) comprising a plurality of rectification sections (112,114,116,118,120) arranged adjacent to one another, including an upper rectification section and a plurality of lower rectification sections, wherein, during operation of the rectification column system, evaporation of liquid present in the rectification column is achieved by heating liquid in each rectification section by heating means provided in each rectification section,
    wherein heating of at least one of the plurality of rectification sections is provided by heating means comprising a heat pump cycle (112b), and heating of at least one further rectification section of the plurality of rectification sections is provided by means comprising an electrical heater.

2. The method according to claim 1, wherein the heating in the upper rectification section is provided by the heat pump cycle which connects a reboiler (132) of the upper rectification section (112) and a condenser (122) associated with the upper rectification section (112).

3. The method according to claim 2, wherein the working fluid is liquid nitrogen which is supplied to the condenser from a liquid nitrogen vessel.

4. The method according to claim 3, wherein the liquid nitrogen vessel is positioned below the condenser.

5. The method according to claim 2, wherein the condenser is positioned within the upper rectification section.

6. The method according to claim 2, wherein the condenser is positioned above the upper rectification section.

7. The method according to claim 1, wherein pressures within the rectification column system range from 0.5 bar abs in the upper rectification section to around 3 bar abs in a lowermost rectification section.

8. The method according to claim 1, wherein temperatures within the rectification column system range from 77K in the upper rectification section to around 95 K in a lowermost rectification section.

9. The method according to claim 1, wherein a liquefied working fluid of the heat pump cycle is supplied to the condenser (122) using at least one pump (210,220).

10. The method according to claim 1, wherein a working fluid of the heat pump cycle is nitrogen.

11. The method according to claim 1, wherein a working fluid of the heat pump cycle is the CO.

12. The method according to claim 1, wherein said at least one CO isotope compound is 13C16O.

13. The method according to claim 1, further comprising, in the heat pump cycle, compressing and cooling an external working fluid in a compressor unit, further cooling the external working fluid in a main counter-current heat exchanger to a temperature close to the dew temperature of the external working fluid, condensing the external working fluid in a reboiler whereby heat from the external working fluid is transferred to said at least one of the plurality of rectification sections, expanding condensed external working fluid from the reboiler, introducing expanding condensed external working fluid into a condenser wherein the condensed external working fluid absorbs heat from vapor produced by at least one of the plurality of rectification sections, heating the external working fluid in the main counter-current heat exchanger, and returning the external working fluid to an inlet of the compressor unit.

14. The method according to claim 1, wherein the heat pump cycle provides heating for the upper rectification section and at least one of the plurality of lower rectification sections.

15. The method according to claim 1, wherein the rectification of CO feed stream within the rectification system produces a material stream having a concentration of 13C16O greater than 10 mol %.

16. An apparatus for separating at least one CO isotope compound from natural CO, comprising:
    a rectification column system (110) comprising a plurality of rectification sections (112,114,116,118,120) arranged adjacent to one another, including an upper rectification section (112) and a plurality of lower rectification sections (114,116,118,120), each rectification section comprising a heating means (112a,114a, 116a,118a,120a) to maintain evaporation of liquid present therein,
    wherein the heating means (112a) of at least one of the plurality of rectification sections (112) comprises an external heat pump cycle (112b), and the heating means of at least one further rectification section of the plurality of rectification sections comprises an electrical heater.

17. The apparatus according to claim 16, wherein the heating means (112a) of the upper rectification section (112) comprises a heat pump cycle (112b) connecting a reboiler (132) of the upper rectification section (112) and a condenser (122) associated with the upper rectification section (112).

18. The apparatus according to claim 16, wherein at least one of the plurality of lower rectification sections (114,116, 118,120) comprises an electric heating means.

19. The apparatus according to claim 16, wherein rectification sections provided with heating means comprising a heat pump cycle (112b) are arranged above ground, and rectification sections not provided with heating means comprising a heat pump cycle are arranged underground.

20. The apparatus according to claim 16, wherein the heat pump cycle (112b) comprises a compressor unit (130) adapted to compress gaseous nitrogen, wherein an inlet pressure of the compressor unit (130) is around 0.5 to 1.5 bar abs, and an outlet pressure of the compressor unit is larger than 1.5 bar abs.

\* \* \* \* \*